Aug. 9, 1927.
H. M. WILCOX
UTENSIL FOR COOKING ANNULAR FOOD PRODUCTS
Filed May 13, 1926
1,638,673
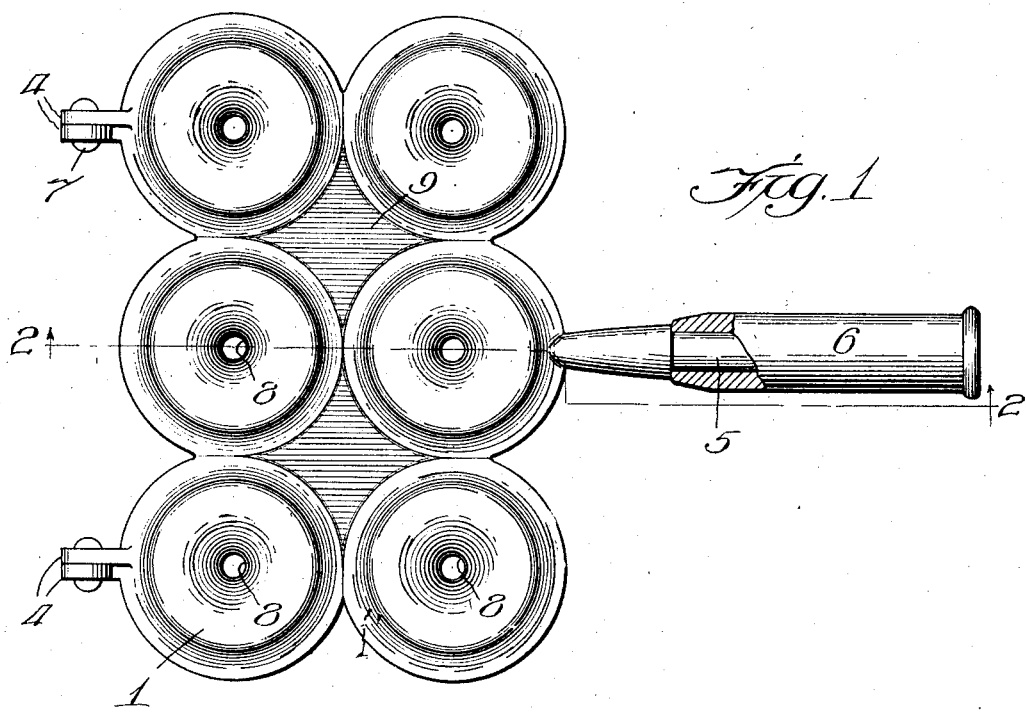
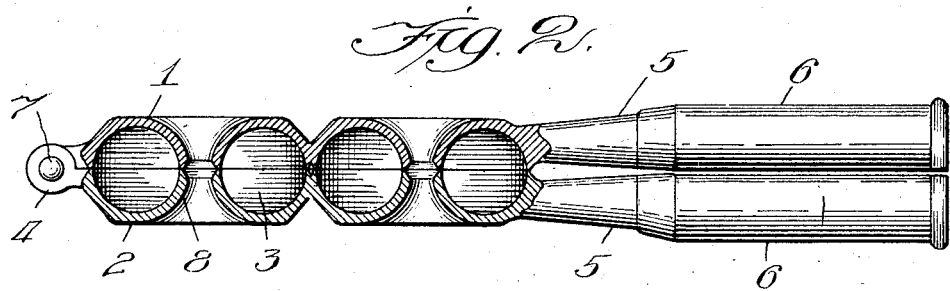

Patented Aug. 9, 1927.

1,638,673

UNITED STATES PATENT OFFICE.

HENRY M. WILCOX, OF CHICAGO, ILLINOIS.

UTENSIL FOR COOKING ANNULAR FOOD PRODUCTS.

Application filed May 13, 1926. Serial No. 108,722.

The object of the present invention is to make it possible to produce food products similar to doughnuts without cooking them in grease, thus obviating the objectionable characteristics in doughnuts, due to grease.

In carrying out my invention I employ a two-part mold having a central tunnel or passage extending through the same from the top to the bottom, the mold containing a mold cavity, surrounding the walls of the tunnel or passage, that has the shape of the product to be produced. The walls of the mold and of the tunnel or passage are made comparatively thin and of approximately uniform thickness, so that the material to be cooked will be uniformly heated over its entire periphery when the utensil is placed over a flame or other source of heat.

Specifically considered, therefore, the present invention may be said to have for its object to produce a simple and novel utensil for cooking a food product having some of the characteristics of a doughnut without employing grease or any other liquid heating medium.

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is a top plan view of a device arranged in accordance with my invention, showing multiple molds; and Fig. 2 is a section taken approximately on line 2—2 of Fig. 1.

In the drawing I have illustrated my invention as applied to a device containing half a dozen molds, whereby as many units may be cooked at a time, and the detailed description will be confined to this particular form of device, for the sake of brevity; although the present invention is not limited by the number of molds or mold cavities present in a single utensil.

Referring to the drawing, 1 and 2 represent two similar half molds. The mold cavities are so formed that when the two halves of the mold are placed together, the mold will contain annular cavities 3, conveniently circular in section on any plane extending radially from the axis of the cavity to the periphery of the latter. The mold sections are provided with hinge ears 4, so disposed that when the two halves are placed together the hinge ears will be in operative relation to each other. On the side opposite that at which the hinge ears are located, are suitable handles 5, provided with hand holds 6 that are poor conductors of heat. When the two parts of the mold are fastened together by means of hinge pins 7, the mold may be opened by swinging the handles apart and be closed and held closed by bringing the two handles together.

Each individual unit of each mold section is in the form of a shallow pan having a reentrant, open-ended tubular part 8 forming a continuation of the bottom wall. These tubular elements are made of such length that when the mold is closed, each of the tubular elements will abut at its inner end against the inner end of the opposite tubular element. The body of the mold is made of metal, preferably aluminum, so disposed that each mold cavity is completely enclosed in walls of approximately uniform thickness. Where a group of mold cavities are employed in a single utensil, the openings that would be left between each group of four are closed by webs 9, forming an integral part of the mold.

In using the utensil, a doughnut batch is made up in the form of a batter instead of a dough; the mold is opened, preferably after it has been heated, and one-half of the same is filled with the batter. The mold is then closed and is held over the source of heat. As the batter cooks, it swells and fills the mold cavities and thereafter the utensil may be turned over so as to bring the opposite side directly over the source of heat. The cooking will be completed in a very short time, the utensil being preferably turned over a few times in order to insure uniform browning of the surfaces of the doughnuts. The heat and the heated gases rising from the source of heat, will pass through the tunnels or passages, so that the entire lower half of each doughnut will be uniformly heated at all points and there will consequently be no unevenness in the surface color. The webs 9 prevent waste of heat and hot gases, but spread the same toward the tunnels that serve as chimneys.

The edges of the mold units, both around the top of each half mold cavity and around the top or inner end of each central tubular member, are preferably made comparatively narrow so that if the batter, when it is poured into the mold, runs over one of these edges, not enough of it can be caught between the melting edges of the mold when the latter is closed to form any appreciable fin on the food product along the plane of division in the mold.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

A device for cooking annular food products, comprising an imperforate two-part mold having at the top and bottom central tubular reentrant portions that abut against each other when the two parts are placed together, thus producing a central passage extending through the mold and a closed annular molding compartment surrounding said passage, the walls of the mold and of the tubular portions being of approximately uniform thickness.

In testimony whereof, I sign this specification.

HENRY M. WILCOX.